United States Patent
Nicolai

(10) Patent No.: US 7,621,664 B2
(45) Date of Patent: Nov. 24, 2009

(54) LIGHTING AND/OR SIGNALING DEVICE FOR A MOTOR VEHICLE INCORPORATING A MATERIAL HAVING THERMAL ANISOTROPY

(75) Inventor: Jean-Marc Nicolai, Courbevoie (FR)

(73) Assignee: Valeo Vison, Bobigny (FR)

( * ) Notice: Subject to any disclaimer, the term of this patent is extended or adjusted under 35 U.S.C. 154(b) by 90 days.

(21) Appl. No.: 11/535,590

(22) Filed: Sep. 27, 2006

(65) Prior Publication Data

US 2007/0076422 A1 Apr. 5, 2007

(30) Foreign Application Priority Data

Sep. 30, 2005 (FR) .................................. 05 10034

(51) Int. Cl.
*B60Q 1/00* (2006.01)
(52) U.S. Cl. .................... 362/547; 362/294; 362/545
(58) Field of Classification Search ................ 362/545, 362/547, 249, 548; 423/448
See application file for complete search history.

(56) References Cited

U.S. PATENT DOCUMENTS

| | | | | |
|---|---|---|---|---|
| 5,455,747 | A * | 10/1995 | Aoyama ...................... 362/545 |
| 6,220,722 | B1 * | 4/2001 | Begemann ................... 362/231 |
| 6,482,520 | B1 * | 11/2002 | Tzeng ......................... 428/408 |
| 6,503,626 | B1 * | 1/2003 | Norley et al. ................ 428/408 |
| 6,746,768 | B2 * | 6/2004 | Greinke et al. .............. 428/408 |
| 6,749,010 | B2 * | 6/2004 | Getz et al. ................... 165/80.3 |
| 6,758,263 | B2 | 7/2004 | Krassowski et al. |
| 6,771,502 | B2 * | 8/2004 | Getz et al. ................... 165/80.3 |
| 6,968,890 | B1 | 11/2005 | Ghantiwala |
| 7,108,055 | B2 * | 9/2006 | Krassowski et al. ......... 165/185 |
| 7,188,985 | B2 * | 3/2007 | Ishida ......................... 362/548 |
| 7,300,191 | B2 * | 11/2007 | Oshio et al. ................. 362/545 |
| 7,329,033 | B2 * | 2/2008 | Glovatsky et al. .......... 362/547 |
| 2002/0142165 | A1 | 10/2002 | Norley et al. |
| 2002/0182397 | A1 * | 12/2002 | Whatley ................... 428/297.4 |
| 2003/0116312 | A1 | 6/2003 | Krassowski et al. |
| 2004/0000391 | A1 * | 1/2004 | Getz et al. ................... 165/80.3 |
| 2004/0179366 | A1 * | 9/2004 | Takeda et al. ............... 362/464 |
| 2004/0202007 | A1 | 10/2004 | Yagi et al. |
| 2005/0018445 | A1 * | 1/2005 | Sazuka et al. ............... 362/545 |
| 2005/0018446 | A1 * | 1/2005 | Ishida ......................... 362/545 |
| 2005/0094411 | A1 | 5/2005 | Ishida et al. |
| 2005/0105301 | A1 * | 5/2005 | Takeda et al. ............... 362/545 |
| 2006/0086493 | A1 * | 4/2006 | Fujiwara et al. ............. 165/185 |
| 2006/0215416 | A1 * | 9/2006 | Lucas et al. ................. 362/545 |

FOREIGN PATENT DOCUMENTS

FR 2858043 1/2005

* cited by examiner

*Primary Examiner*—John A Ward
(74) *Attorney, Agent, or Firm*—Jacox, Meckstroth & Jenkins

(57) ABSTRACT

The device comprises at least one power light emitting diode light source and other means able to constitute one or more heat sources of such a nature as to affect the thermal environment of the light emitting diode light source. In accordance with the invention, the device also comprises a support piece formed at least partially from a material based on anisotropic graphite supporting the light emitting diode light source and opposing an effect of the other means on the thermal environment of the light emitting diode light source. According to other characteristics, the support piece comprises at least one thermal dissipation heat sink and the device can comprise a fan able to force a circulation of air through the heat sink.

24 Claims, 2 Drawing Sheets

LIGHTING AND/OR SIGNALING DEVICE FOR A MOTOR VEHICLE INCORPORATING A MATERIAL HAVING THERMAL ANISOTROPY

BACKGROUND OF THE INVENTION

1. Field of the Invention

The invention concerns in general terms lighting and/or signaling devices intended to be mounted in motor vehicles. More particularly, the invention concerns lighting and/or signaling devices for a motor vehicle comprising at least one power light emitting diode light source and other means able to constitute one or more heat sources of such a nature as to affect the thermal environment of the power light emitting diode light source.

2. Description of the Related Art

Recent technological developments in the field of white power light emitting diodes make more and more probable a rise in power in the use of these light sources for performing lighting and signaling functions in a vehicle.

With regard to technical performance, power light emitting diodes, referred to as "power LEDs", have undeniable strengths making them particularly attractive in a certain number of applications. With regard to their service life, their efficiency and their shape factor, power LED diodes have a great advantage in particular compared with more traditional light sources such as filament lamps.

The integration of power LED diodes in headlights and signaling lights does however pose difficulties and new constraints relating to the necessity for efficient thermal management in a relatively confined environment represented by the internal volume of a headlight or signaling light. These thermal management constraints are particularly difficult to overcome in the case of a headlight, in particular because of the location thereof partly in the engine compartment of the vehicle and the lighting powers concerned.

This efficient thermal management is necessary in the case of power LED diodes because of the fact that the maximum nominal values of the junction temperatures thereof, around 150° C., are relatively low in the context of automobile lighting/signaling applications. This is because it is frequent for an internal ambient temperature of 90 to 100° C. to be reached.

Current technical solutions consist of mounting the substrates supporting the power LED diodes on one or more aluminum heat sinks in close thermal contact with them. A forced circulation of air by means of a fan is also sometimes introduced so as to improve the thermal dissipation. These known solutions may lead to heat sinks of significant volume and weight that make it tricky to design modern lighting/ signaling devices in which new functions of the AFS type are to be installed. AFS is the abbreviation of the English term Advanced Front Lighting System, and groups together, in recent European regulations, a certain number of new functions such as bending dipped beam, also referred to in English as DBL, standing for "dynamic bending light", or motorway beam, referred to in English as "motorway".

These new functions may lead to adding supplementary light sources that constitute as many close heat sources having a substantial impact on the junction temperature of the power LED diodes.

Moreover, without going here into the details of the normal drawbacks relating to the weight of equipment installed in a motor vehicle, let us note particularly that the inclusion of heat sinks substantially increases the mechanical inertia of the parts supporting the LED diodes, knowing that the latter are liable to move in rotation dynamically in the context of a bending dipped lighting function (DBL, standing for "dynamic bending light" in English).

SUMMARY OF THE INVENTION

According to a first aspect, the present invention supplies a lighting and/or signaling device for a motor vehicle comprising at least one power light emitting diode light source and other means able to constitute one or more heat sources of such a nature to affect the thermal environment of the power light emitting diode light source.

According to one embodiment of the invention, the lighting and/or signaling device comprises a support piece formed at least partially from a material based on anisotropic graphite supporting the power light emitting diode light source and opposing an effect of the other means on the thermal environment of the power light emitting diode light source.

This embodiment of the invention therefore concerns a lighting and/or signaling device for a motor vehicle comprising at least one power light emitting diode light source and at least one other heat source, comprising a support piece formed at least partially from a material based on anisotropic graphite supporting the power light emitting diode light source and opposing an effect of the other means on the thermal environment of the power light emitting diode light source.

Advantageously, the support piece comprises a wall separating the diode light source from the other heat source, and this wall has a greater thermal resistance through its thickness than longitudinally. This wall can then serve as a heat screen between the light emitting diode, also referred to as the "LED" for reasons of conciseness, and another heat source of an automobile headlight, in particular a conventional lamp of the filament type or a xenon lamp. The support piece, apart from its anisotropy conferred by the graphite that at least partially makes it up, and through its shape, can thus have a modulated thermal conductivity: being as little conductive as possible between the LED and the other heat source and on the contrary being as conductive as possible between the LED and a "cold" zone of the headlight or of the vicinity of the headlight.

The use according to the invention of anisotropic graphite, in particular a graphite in a lamellar structure, allows the production of compact and lightweight lighting and/or signaling devices, while satisfying the thermal constraints imposed on power light emitting diodes. This result is made possible in particular because of the superior characteristics of anisotropic graphite compared with aluminum, in terms of density and thermal conductivity, and through the high thermal anisotropy presented by this material. This thermal anisotropy allows the design of heat screens vis-à-vis heat sources, such as filament lamps, situated close to the diodes.

The device according to the invention can also comprise one or more of the following characteristics:

- the support piece comprises at least one thermal dissipation heat sink,
- a fan is provided in the device, able to force a circulation of air through the thermal dissipation heat sink,
- the heat sink comprises at least one part formed in a material based on anisotropic graphite, this part having a privileged thermal conductivity direction that is parallel to fins on the heat sink,
- the thermal dissipation heat sink comprises at least one part made from aluminum,
- elements conferring mechanical rigidity on the support piece are provided in the device, the mechanical rigidity elements comprise at least one electronic substrate on which the power light emitting diode light source is mounted, the mechanical rigidity elements comprise at least two rigid plates disposed, in a sandwich configuration, on each side of at least part of the material based on anisotropic graphite, at least one of the rigid plates consists of an electronic substrate on which the power light emitting diode light source is mounted, at least one of the rigid plates is a plate forming an earth plane able to fulfill an electromagnetic shielding function, means are provided in the device, cooperating with the support piece so as to allow a rotational adjustment, on at least one predetermined axis, of the support piece.

In the lighting and/or signaling device according to the invention, the other means able to constitute one or more heat sources consist of at least one light source from amongst the following: a power light emitting diode light source, an incandescent lamp and a discharge lamp, also referred to as a xenon lamp.

Advantageously, the support piece comprises several walls, in particular disposed obliquely or perpendicular to one another.

The various walls of the support piece can be mono- or multi-component: they can be made from different materials (anisotropic graphite, mechanically reinforced or not, for example) and/or be fabricated separately and then assembled or fabricated in a single step.

According to other aspects, the invention also concerns a lighting and/or signaling system for a motor vehicle comprising at least two lighting and/or signaling devices as described briefly above, and a motor vehicle equipped with at least one device of the invention.

These and other objects and advantages of the invention will be apparent from the following description, the accompanying drawings and the appended claims.

Other aspects and advantages of the present invention will emerge more clearly from a reading of the description of particular embodiments that follow, this description being given by way of non-limiting example and made with reference to the accompanying drawings, in which:

BRIEF DESCRIPTION OF THE ACCOMPANYING DRAWINGS

DETAILED DESCRIPTION OF THE PREFERRED EMBODIMENTS

Figure 1:
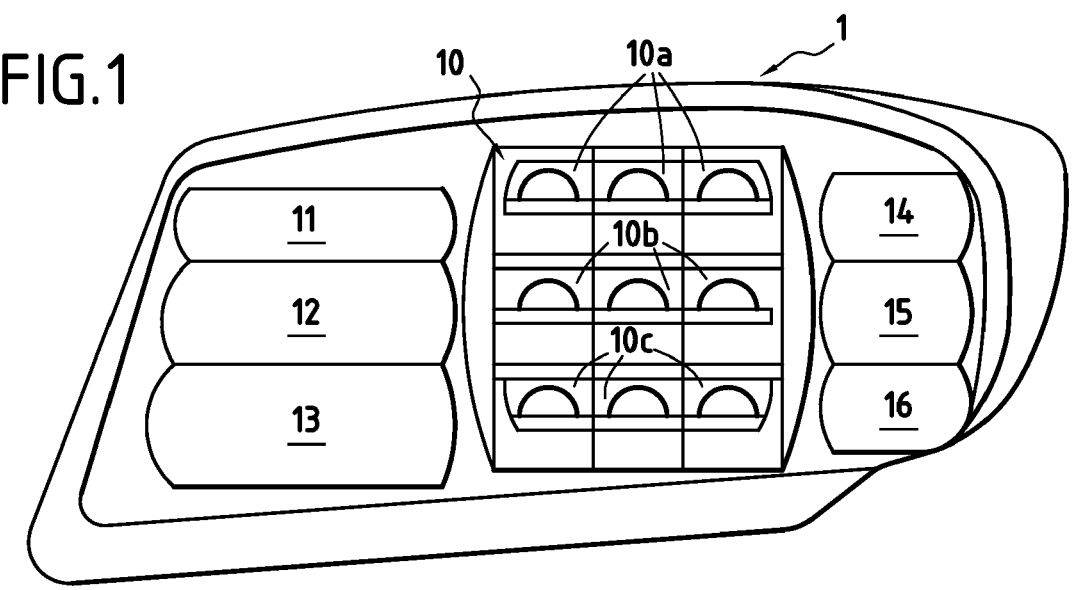
FIG. 1 is an overall front view of a headlight according to the invention comprising a power light emitting diode lighting module.
Figure 2:
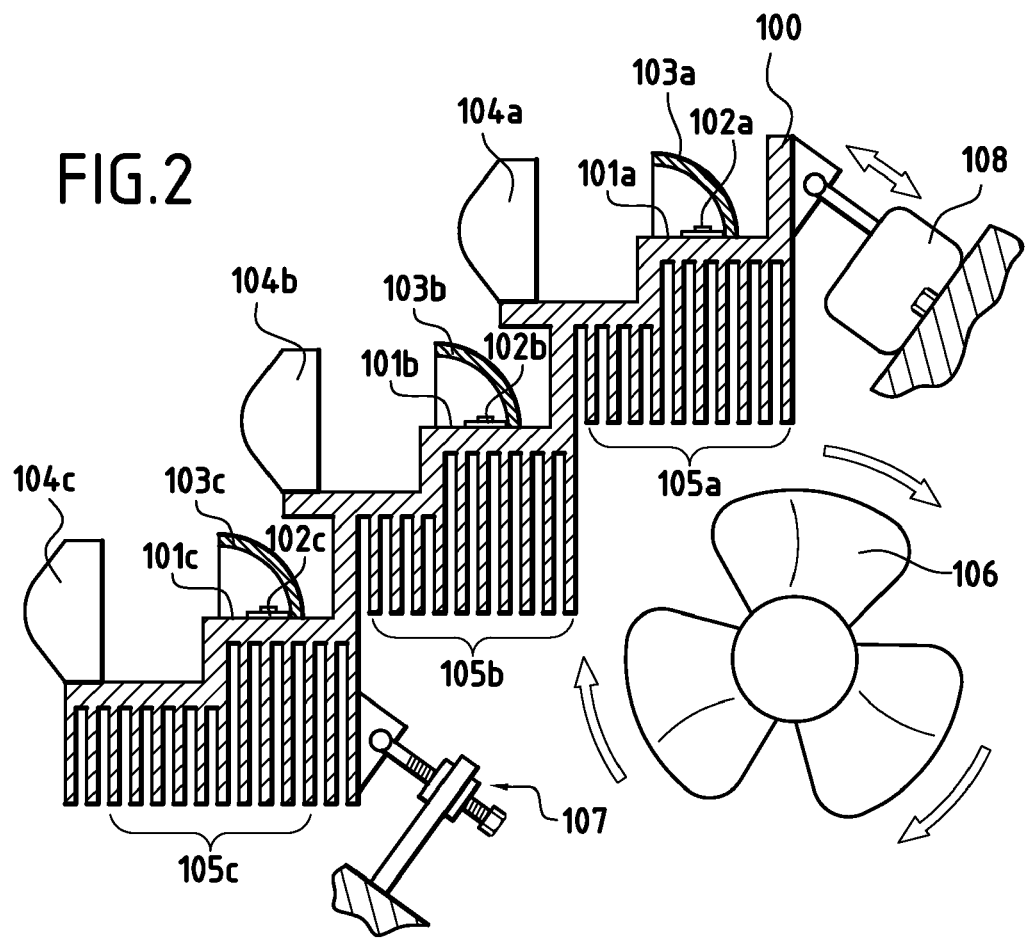
FIG. 2 is a partial view in vertical section of the power light emitting diode lighting module included in the headlight in FIG. 1.
Figure 3:
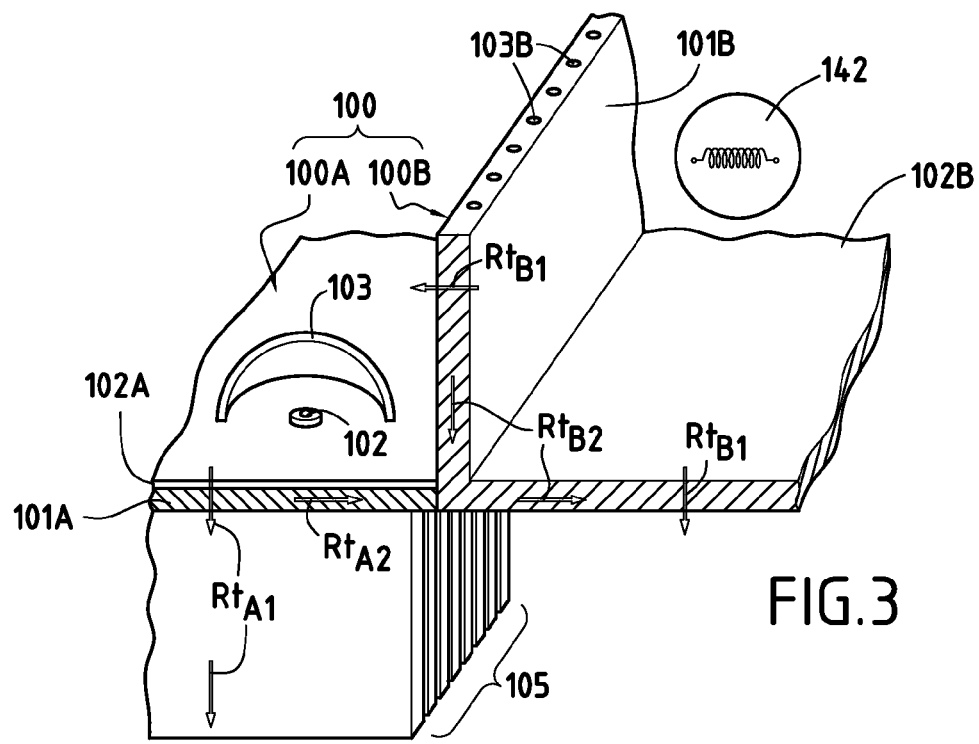
FIG. 3 is a partial perspective view of a support piece made from anisotropic graphite included in the headlight in FIG. 1, as a portion of the piece supporting a power light emitting diode.

With reference essentially to FIGS. 1 to 3, a description is now given of a first particular embodiment, designated overall 1, of a lighting and/or signaling device such as a headlight according to the invention.

In this particular embodiment, the headlight 1 comprises light sources of various types, namely power light emitting diodes and incandescent lamps. These various light sources are included in lighting and signaling modules 10 to 16 of the headlight 1, modules that will be shown in front view in FIG. 1.

In this example, the lighting module 10 is a dipped/main beam lighting module comprising nine power LED diodes emitting a white light.

The modules 11 to 16 are lighting modules and signaling modules fulfilling functions such as fog lighting, change of direction blinking indicator, daytime lighting (DRL, standing for "day running light" in English) and AFS functions such as fixed bending dipped beam, motorway lighting and the like.

In a variant, the modules 11 to 16 can also comprise power LED diodes as light sources. In another variant embodiment, one of the modules 11 to 16 is provided with a discharge lamp of the xenon type and fulfils the main-beam lighting function.

With reference now more particularly to FIG. 2, the headlight 1 comprises a support piece 100 having horizontal stepped parts 101a, 101b and 101c on which power LED diodes 102a, 102b and 102c are mounted. Each stepped part 101a, 101b, 101c supports three LED diodes mounted close to one another on the same horizontal plane. FIG. 2 being a view in vertical section through the lighting module 10, only one LED diode appears in this figure in each of the stepped parts 101b, 101c.

The LED diodes 102a, 102b and 102c, in association with reflectors 103a, 103b and 103c and respective lenses 104a, 104b and 104c, form lighting submodules 10a, 10b and 10c included in the lighting module 10. In this way a global light beam is produced that is composed of the various light outputs supplied by these lighting submodules 10a, 10b and 10c.

In addition to the function of mounting support for the power LED diodes, lenses and reflectors, the piece 100 participates in the thermal management of the headlight 1.

In accordance with the invention, optimum thermal management can be obtained by producing the piece 100 from an anisotropic material having different thermal conductivities on at least two axes. This anisotropy characteristic of the piece 100 is described in more detail later in the description.

As shown in FIG. 2, the piece 100 comprises a plurality of cooling fins 105a, 105b and 105c extending downwards from faces opposite to those on which the LED diodes 102a, 102b and 102c are mounted. In this particular embodiment, the conduction of the air over the fins 105a, 105b and 105c is forced by means of a fan 106 integrated in the housing of the headlight 1.

In a known manner, a mechanical relationship is provided allowing limited pivoting between the piece 100 and the housing of the headlight 1 fixed to the bodywork of the vehicle. The pivoting of the piece 100 allows adjustment of the angle of elevation of the headlight 1 by rotation of the piece 100 about a horizontal axis perpendicular to the longitudinal axis of the vehicle. An assembly forming a pivot 107 and an actuator 108, shown in FIG. 2, are provided in the headlight 1 so as to allow this limited pivoting mechanical relationship.

With reference to FIG. 3, the piece 100 is now described in more detail in particular in relation to its anisotropy characteristic.

In the embodiment shown in FIG. 3, this piece 100 is of the composite type in that it is formed by bonding two parts 100A and 100B in a single-piece assembly.

The parts 100A and 100B are obtained from one or more anisotropic materials. Preferably use is made of anisotropic graphites such as those sold by the company Graftech International Ltd., Cleveland, Ohio, USA and described in the patents US-2002/0142165 and U.S. Pat. No. 6,482,520, the disclosures of which are incorporated herein by reference in the present application and made a part hereof. Such graphites can be obtained with thermal anisotropy ratios ranging from 5 to 50.

Anisotropic graphite, such as those sold by Graftech International Ltd. and having adapted thermal characteristics may in certain cases, as they stand, prove to be not very compatible mechanically for producing the piece 100. Thus, for example, graphite having a suitable anisotropic characteristic may prove to be too flexible, which is detrimental because of the precise positioning requirements frequently imposed on the various functional elements of an optical system.

In accordance with the invention, rigidity and appropriate mechanical properties can be afforded for the piece 100 by various means such as the surface fixing of a rigid plate (for example an electronic substrate) or the incorporation during the manufacture of the graphite material of one or more rigid elements embedded in the mass of the material.

The flexibility of the anisotropic graphite is however advantageous for fulfilling a thermal interface function between the electronic substrates and the thermal dissipation elements. The graphite with the registered trade mark GRAFOIL can for example be used for the thermal interfaces.

As is clear in FIG. 3, the part 100a is that forming a thermal dissipation heat sink strictly speaking and being responsible for dissipating the heat generated in particular by the LED diodes 102.

The part 100A comprises a portion forming a base 101A housing a first face on which there is fixed an electronic substrate 102A supporting the LED diodes 102 and a second face from which the fins 105 extend vertically. Naturally the electronic substrate fixed to the first face of the part 102A comprises, apart from the LED diodes 102, the various electrical connection tracks for supplying the LED diodes and any other electronic components of the circuit.

In this embodiment, the part 100A is produced by machining from a block of anisotropic graphite having good mechanical rigidity. In a variant, the part 100A can be of the composite type, consisting for example of a base 101A and fins 105 produced with materials of various types such as natural graphite/anisotropic graphite, ceramic/anisotropic graphite, aluminum/anisotropic graphite or other combinations.

The part 100A is here produced so as to have a privileged thermal conductivity direction parallel to the fins 105 and in the direction of the thickness of the base 101A. In this privilege direction, the part 100A offers a thermal resistance $Rt_{A1}$ of low value compared with the one $Rt_{A2}$ existing in the planes of material perpendicular to the privileged direction.

In this embodiment, the part 100B made from anisotropic graphite fulfils a heat screen function, by preventing a rise in temperature in the environment of the LED diodes 102 due to the release of heat contributed by the incandescent lamp 142 shown in FIG. 3.

The part 100B comprises here two planar sections at right angles, 101B and 102B, having a high-value thermal resistance $Rt_{B1}$ in the direction of the thickness. In the planes and material of the sections 101B and 102B, the anisotropic graphite has a privileged thermal conductivity direction with a thermal resistance $Rt_{B2}$ with a substantially lower value than that of $Rt_{B1}$.

Naturally, in general terms, a person skilled in the art can act on the thicknesses and lengths in various portions of the pieces made from anisotropic graphite in order to adjust the thermal resistances to required values.

The rigidity of the part 100B is here obtained by virtue of rigid elements 102B embedded in the material of section 102B. The part 100B is fabricated for example by means of a molding technique with compression.

Figure 4:
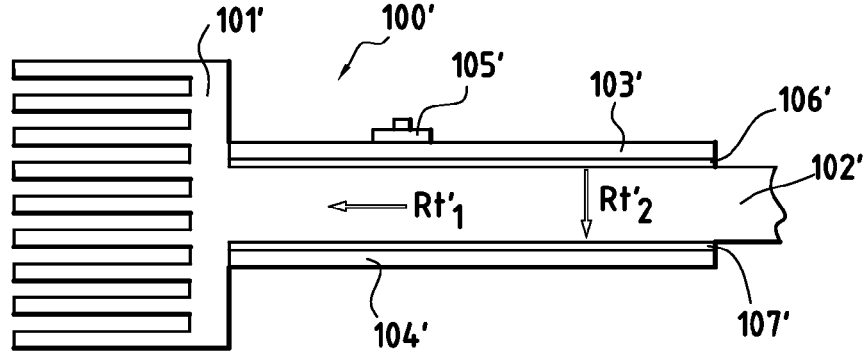
FIGS. 4 and 5 show two other embodiments of the support piece made from anisotropic graphite.
Figure 5:
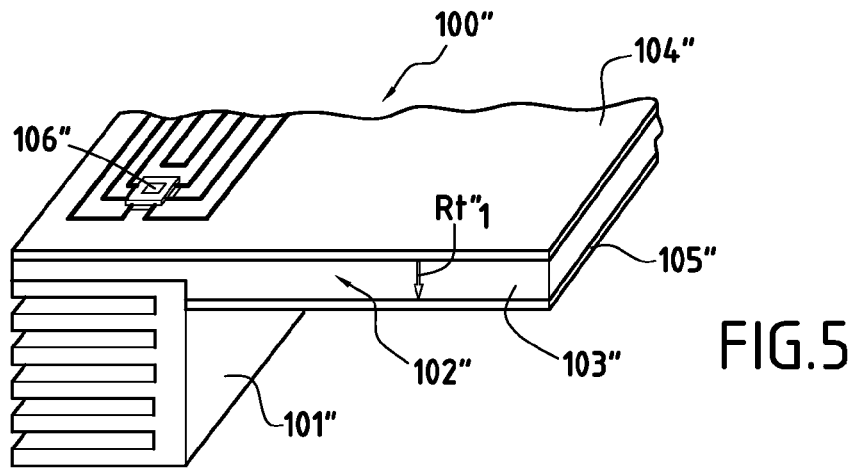

With reference to FIGS. 4 and 5, a description is now given of two other examples of configuration of the piece 100' and 100", of the same type as the piece 100, in different embodiments of a lighting and/or signaling device according to the invention.

The piece 100' shown is FIG. 4 is for example obtained by molding operations with compression and machining of a single block of anisotropic graphite.

The piece 100' comprises a part 101' forming a thermal dissipation heat sink and a part 102' forming a heat screen. Electronic substrates 103' and 104' are fixed in a configuration of the sandwich type on opposite faces of the part 102'.

The privileged direction of thermal conductivity of the piece 100' is situated in the planes of material of the part 102' perpendicular to the thickness of the latter and parallel to the fins of the part 101'. The thermal resistance in the privileged direction of the piece 100' has a value $Rt'_1$ much less than the one $Rt'_2$ existing in the direction of the thickness of the part 102'.

The high thermal resistance $Rt'_2$ makes it possible to obtain in this configuration a heat screen effect between an LED diode 105' mounted on the substrate 103' and heat sources (not shown) present on the substrate 104'.

The rigidity of this configuration is afforded by the substrates 103' and 104'. Thermal interface sheets 106' and 107' made from anisotropic graphite are here provided between the substrates 103' and 104' and the corresponding faces of the part 102'.

The piece 100 shown in FIG. 3 is of the composite type, which means here that it is formed from first and second distinct elements, fixed rigidly to each other, for example by adhesive bonding.

The first element or piece 100" (FIG. 5) is formed by a heat sink 101" made from anodized aluminum. The second element is a substrate support/heat screen 102" comprising a plate of anisotropic graphite 103" in a sandwich between an electronic substrate 104" and a metal electromagnetic shielding plate or metallization 105".

The substrate 104" and the plate 105" are fixed to opposite faces of the plate 103".

A source with power LED diode 106" is mounted on the substrate 104" on a portion thereof situated above the heat sink 101". In addition to the mechanical rigidity that can be afforded here by the substrate 104", an additional mechanical rigidity is granted to this configuration by the heat sink 101" fixed to the plate 103".

In this configuration, the main function of the electromagnetic shielding plate 105" is to improve the electromagnetic compatibility (EMC) performance of the lighting and/or signaling device according to the invention. However, in the form of a rigid metallic sheet, the shielding plate 105" can also participate in the mechanical rigidity of the assembly.

The heat screen effect is obtained here because of a high-value thermal resistance $Rt_1$ in the direction of the thickness of the plate 103".

Although in the various embodiments described here a global mechanical rigidity of the piece 100, 100', 100" is sought, it should be noted here that in other embodiments the flexibility of the anisotropic graphite constitutes an advantage. Thus for example, in a signaling light with LED diodes for a motor vehicle, the production of a flexible structural piece made from anisotropic graphite incorporating parts forming heat sinks and parts allowing the mounting of electronic substrates supporting the LED diode sources may, in certain applications, prove to be a technically and economically efficient solution compared with known solutions based on the use of flexible substrates known as "flex" and aluminum heat sinks.

Naturally, the present invention is not limited to the details of the embodiments described here by way of example but on the contrary extends to the various modifications with the capability of a person skilled in the art, which will be dictated to him by the envisaged applications of the invention. The invention can therefore take a multitude of different embodiments, only a few examples of which are detailed in the present description.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A lighting and/or signaling device for a motor vehicle comprising at least one power light emitting diode light source and at least one other light source of heat, comprising a support piece at least partially formed from a material comprising an anisotropic graphite, said support piece comprising a first surface for supporting said power light emitting diode light source and a second surface for separating said power light emitting diode light source from said at least one other light source of heat to oppose an effect of heat from said at least one other light source of heat on a thermal environment of said at least one power light emitting diode light source, each of said first surface and said second surface comprising anisotropic properties that facilitate transferring heat away from each of said at least one power light emitting diode light source and said at least one other light source of heat;
    wherein said second surfaces comprise a wall separating said at least one power light emitting diode light source from the said at least one other light source of heat;
    wherein said wall has a thermal resistance greater across its thickness than longitudinally.

2. The lighting and/or signaling device according to claim 1, wherein said support piece comprises at least one thermal dissipation heat sink.

3. The lighting and/or signaling device according to claim 2, wherein said at least one thermal dissipation heat sink comprises at least one part formed from a different material based on anisotropic graphite, said part having a privileged thermal conductivity direction that is parallel to a plurality of fins on said thermal dissipation heat sink.

4. The lighting and/or signaling device according to claim 2, wherein said at least one thermal dissipation heat sink comprises at least one part made from aluminum.

5. The lighting and/or signaling device according to claim 2, wherein said at least one thermal dissipation heat sink comprises at least one part formed from a material based on anisotropic graphite, said part having a privileged thermal conductivity direction that is parallel to a plurality of fins on said thermal dissipation heat sink, wherein said support piece and said at least one thermal dissipation heat sink being an integral one-piece construction.

6. The lighting and/or signaling device according to claim 1, further comprising at least one element conferring mechanical strength on the support.

7. The lighting and/or signaling device according to claim 6, wherein said at least one element comprises at least one electronic substrate on which said power light emitting diode light source is mounted.

8. The lighting and/or signaling device according to claim 6, wherein said at least one element comprises at least two rigid plates disposed, in a sandwich configuration, on each side of at least part of the material based on anisotropic graphite.

9. The lighting and/or signaling device according to claim 8, wherein at least one of said at least two rigid plates consists of an electronic substrate on which said at least one power light emitting diode light source is mounted.

10. The lighting and/or signaling device according to claim 8, wherein at least one of said at least two rigid plates is a plate forming an earth plane able to fulfill an electromagnetic shielding function.

11. The lighting and/or signaling device according to claim 1, wherein said at least one other light source of heat comprises at least one light source amongst the following: a power light emitting diode light source, an incandescent lamp and a discharge lamp.

12. The lighting and/or signaling device according to claim 1, wherein said support piece comprises a plurality of walls, in particular disposed obliquely or perpendicular to one another.

13. The lighting and/or signaling device according to claim 1, wherein said support piece comprises a plurality of walls that are mono- or multi-component.

14. A motor vehicle, comprising one lighting and/or signaling device according to claim 1.

15. A lighting and/or signaling device for a motor vehicle comprising at least one power light emitting diode light source and at least one other light source of heat, comprising a support piece at least partially formed from a material comprising an anisotropic graphite, said support piece comprising a first surface for supporting said rower light emitting diode light source and a second surface for separating said rower light emitting diode light source from said at least one other light source of heat to oppose an effect of heat from said at least one other light source of heat on a thermal environment of said at least one rower light emitting diode light source, each of said first surface and said second surface comprising anisotropic properties that facilitate transferring heat away from each of said at least one rower light emitting diode light source and said at least one other light source of heat;
    wherein said support piece comprises at least one thermal dissipation heat sink;
    wherein said lighting and/or signaling device comprises a fan able to force a circulation of air through said at least one thermal dissipation heat sink.

16. A lighting and/or signaling device for a motor vehicle comprising at least one rower light emitting diode light source and at least one other light source of heat, comprising a support piece at least partially formed from a material comprising an anisotropic graphite, said support piece comprising a first surface for supporting said rower light emitting diode light source and a second surface for separating said rower light emitting diode light source from said at least one other light source of heat to oppose an effect of heat from said at least one other light source of heat on a thermal environment of said at least one rower light emitting diode light source, each of said first surface and said second surface comprising anisotropic properties that facilitate transferring heat away from each of said at least one rower light emitting diode light source and said at least one other light source of heat;

which comprises means cooperating with said support piece so as to allow a rotational adjustment, along at least one predetermined axis, of said support piece.

17. A lighting and/or signaling device for a motor vehicle comprising:
a support;
at least one power light emitting diode mounted on said support; and
at least one other light source of heat;
said support comprising a first surface for supporting said at least one power light emitting diode and a second surface for separating said at least one power light emitting diode from said at least one other light source of heat to oppose an effect of heat from said at least one other light source of heat on a thermal environment of said at least one power light emitting diode;
said support comprising anisotropic graphite and each of said first surface and said second surface comprising anisotropic properties that facilitate transferring heat away from each of said at least one power light emitting diode and said at least one other light source of heat;
wherein said second surfaces comprise a wall separating said at least one rower light emitting diode light source from the said at least one other light source of heat;
wherein said wall has a thermal resistance greater across its thickness than longitudinally.

18. The lighting and/or signaling device as recited in claim 17 wherein said support provides a heat screen between said at least one power light emitting diode and said at least one other light source of heat.

19. The lighting and/or signaling device as recited in claim 17 wherein said support comprises different thermal conductivities on at least two axes.

20. The lighting and/or signaling device as recited in claim 17 wherein said support is a composite construction comprising at least one of the following combinations of two materials: natural graphite/anisotropic graphite, ceramic/anisotropic graphite or aluminum/anisotropic graphite.

21. The lighting and/or signaling device as recited in claim 17 wherein said support comprises a plurality of components, at least one of said plurality of components being generally L-shaped or T-shaped in cross-section;
said plurality of components comprising different materials.

22. The lighting and/or signaling device as recited in claim 17 wherein said support is a one-piece molded construction.

23. The lighting and/or signaling device as recited in claim 17 wherein said support comprises a plurality of components, at least one of said plurality of components being generally L-shaped or T-shaped in cross-section; said support further comprising:
a heat sink secured to said L-shaped or T-shaped component.

24. The lighting and/or signaling device according to claim 17, wherein said at least one other light source of heat comprises at least one light source amongst the following: a power light emitting diode light source, an incandescent lamp and a discharge lamp.

* * * * *

UNITED STATES PATENT AND TRADEMARK OFFICE
CERTIFICATE OF CORRECTION

PATENT NO. : 7,621,664 B2
APPLICATION NO. : 11/535590
DATED : November 24, 2009
INVENTOR(S) : Jean-Marc Nicolai It is certified that error appears in the above-identified patent and that said Letters Patent is hereby corrected as shown below:

In Column 6, Line 2, please delete "102B".

In Column 6, Line 10, please delete the first word "is" and insert --in-- therefor.

In Column 8, Line 37, please delete "rower" and insert --power-- therefor.

In Column 8, Line 39, please delete "rower" and insert --power-- therefor.

In Column 8, Line 42, please delete "rower" and insert --power-- therefor.

In Column 8, Line 45, please delete "rower" and insert --power-- therefor.

In Column 8, Line 54, please delete "rower" and insert --power-- therefor.

In Column 8, Line 58, please delete "rower" and insert --power-- therefor.

In Column 8, Line 59, please delete "rower" and insert --power-- therefor.

In Column 8, Line 63, please delete "rower" and insert --power-- therefor.

In Column 8, Line 66, please delete "rower" and insert --power-- therefor.

In Column 9, Line 23, please delete "rower" and insert --power-- therefor.

Signed and Sealed this

Sixteenth Day of March, 2010

David J. Kappos
*Director of the United States Patent and Trademark Office*